US012597827B2

(12) United States Patent
Ogayu et al.

(10) Patent No.: US 12,597,827 B2
(45) Date of Patent: Apr. 7, 2026

(54) CONTROL DEVICE, MOTOR DEVICE, AND OIL PUMP DEVICE

(71) Applicant: MITSUBA Corporation, Gunma (JP)

(72) Inventors: Shun Ogayu, Gunma (JP); Hiroyuki Uchimura, Gunma (JP); Hiroki Saito, Gunma (JP); Tadamasa Endo, Gunma (JP); Masayuki Kamei, Gunma (JP)

(73) Assignee: MITSUBA Corporation, Gunma (JP)

( * ) Notice: Subject to any disclaimer, the term of this patent is extended or adjusted under 35 U.S.C. 154(b) by 216 days.

(21) Appl. No.: 18/641,411

(22) Filed: Apr. 21, 2024

(65) Prior Publication Data

US 2025/0015671 A1 Jan. 9, 2025

(30) Foreign Application Priority Data

Jul. 3, 2023 (JP) ................................. 2023-109552

(51) Int. Cl.
*H02K 7/14* (2006.01)
*H02K 5/22* (2006.01)
*H02K 11/30* (2016.01)

(52) U.S. Cl.
CPC ............... *H02K 7/14* (2013.01); *H02K 5/225* (2013.01); *H02K 11/30* (2016.01)

(58) Field of Classification Search
CPC .......... H02K 7/14; H02K 5/225; H02K 11/30; H02K 2211/03; H02K 11/33; H05K 7/1402; H05K 5/0217; H05K 7/1427; H05K 7/2039; F04B 17/03; H02P 6/00
See application file for complete search history.

(56) References Cited

U.S. PATENT DOCUMENTS

| | | | | |
|---|---|---|---|---|
| 4,908,734 A | * | 3/1990 | Fujioka | H05K 5/0017 |
| | | | | 363/141 |
| 4,935,695 A | * | 6/1990 | Hayes | G01R 31/2801 |
| | | | | 324/750.25 |
| 7,867,023 B2 | * | 1/2011 | Keyser | H05K 5/0069 |
| | | | | 439/567 |

FOREIGN PATENT DOCUMENTS

| | | |
|---|---|---|
| JP | 2021136825 | 9/2021 |
| JP | 2023055142 | 4/2023 |

* cited by examiner

*Primary Examiner* — Tulsidas C Patel
*Assistant Examiner* — Mohammed Ahmed Qureshi
(74) *Attorney, Agent, or Firm* — JCIPRNET

(57) ABSTRACT

A control device includes a control board on which a control circuit for controlling an electric motor is mounted, a housing that supports a surface on a side of the control board in a thickness direction, and a cover attached to the housing to cover a surface on the other side of the control board in the thickness direction and a periphery of the control board. First positioning holes penetrating in the thickness direction are formed in the control board. Second positioning holes respectively corresponding to the first positioning holes are formed in the housing. The cover includes positioning pins that protrude toward the housing and have a tapered shape in which a diameter of a circumscribed circle gradually decreases toward a tip. The positioning pin is inserted into the first positioning hole and the second positioning hole corresponding thereto to position the control board, the housing, and the cover.

8 Claims, 8 Drawing Sheets

CONTROL DEVICE, MOTOR DEVICE, AND OIL PUMP DEVICE

CROSS-REFERENCE TO RELATED APPLICATION

This application claims the priority benefits of Japanese application no. 2023-109552, filed on Jul. 3, 2023. The entirety of the above-mentioned patent application is hereby incorporated by reference herein and made a part of this specification.

BACKGROUND

Technical Field

The disclosure relates to a control device, a motor device, and an oil pump device having the same mounted thereon.

Description of Related Art

In recent years, efforts have been made to promote sustainable development goals (2030 Agenda for Sustainable Development, adopted by the United Nations Summit on Sep. 25, 2015; hereinafter referred to as "SDGs"). In addition, a technology aiming at greatly reducing generation of waste through waste prevention, waste reduction, and product recycling and reuse in order to ensure sustainable production and consumption patterns is known.

In the related art, a so-called "mechanical and electrical integrated type" motor device in which an electric motor and a control board for controlling the electric motor are accommodated in a housing and integrated is known. In such a motor device, positioning of the control board relative to the housing is important to cause terminals for supplying a drive power from the control board to the electric motor, non-contact sensors that detect an amount of rotation of the electric motor, and the like to function normally.

As an example, in Patent Document 1, a control board is fixed to a housing with bolts, and a cover covering the control board is fixed to the housing with bolts. As another example, in Patent Document 2, a control board is positioned with respect to a housing using positioning pins, and a cover covering the control board is fixed to the housing.

PATENT DOCUMENTS

[Patent Document 1] Japanese Patent Laid-Open No. 2021-136825
[Patent Document 2] Japanese Patent Laid-Open No. 2023-055142

However, in configurations of Patent Documents 1 and 2, the control board and the cover are individually fixed to the housing. Therefore, there is a problem that the number of parts of a motor device increases and the number of assembly processes increases.

Therefore, an object of the disclosure is to provide a control device for which an assembly process is simplified while positional accuracy of a housing, a control board, and a cover is maintained.

SUMMARY

The disclosure provides a control device including: a control board on which a control circuit for controlling an electric motor is mounted; a housing configured to support a surface on a side of the control board in a thickness direction; and a cover attached to the housing to cover a surface on an other side of the control board in the thickness direction and a periphery of the control board, wherein a plurality of first positioning holes penetrating in the thickness direction are formed in the control board, a plurality of second positioning holes respectively corresponding to the plurality of first positioning holes are formed in the housing, the cover includes a plurality of positioning pins that protrude toward the housing and have a tapered shape in which a diameter of a circumscribed circle gradually decreases toward a tip, and the positioning pin is inserted into the first positioning hole and the second positioning hole corresponding thereto to position the control board, the housing, and the cover.

DESCRIPTION OF THE EMBODIMENTS

According to the disclosure, it is possible to obtain a control device for which an assembly process is simplified while positional accuracy of a housing, a control board, and a cover is maintained. Problems, configurations, and effects other than those described above will be made clear by the following description of the embodiments.

Figure 1:
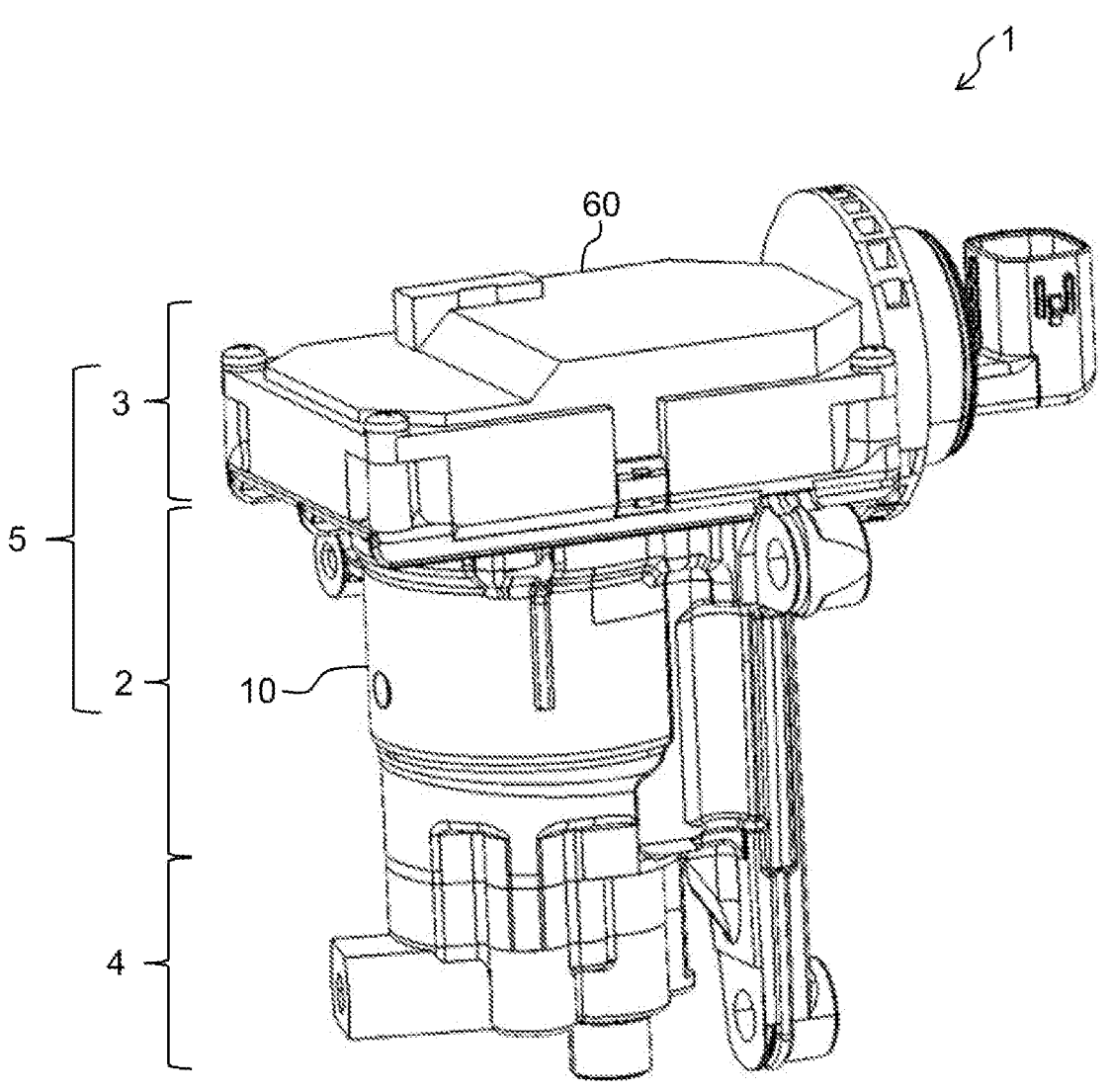
FIG. 1 is an external perspective view of an oil pump device according to the present embodiment.

Hereinafter, an oil pump device 1 according to an embodiment of the disclosure will be described with reference to the drawings. FIG. 1 is an external perspective view of the oil pump device 1 according to the present embodiment.

The oil pump device 1 according to the present embodiment supplies oil (for example, lubricating oil) to an engine clutch or a transmission mechanism clutch mounted on, for example, an automobile. However, the use of the oil pump device 1 is not limited thereto.

As shown in FIG. 1, the oil pump device 1 is a so-called "electric oil pump" including a motor unit 2, a control unit 3, and a pump unit 4. Further, the motor unit 2 and the control unit 3 constitute a so-called "mechanical and electrical integrated type" motor device 5 independently of the pump unit 4. The motor device 5 is not limited to driving the pump unit 4, and may also drive a cooling fan or a wiper. Further, the control unit 3 constitutes a control device that controls the electric motor 6 independently of the motor unit 2 and the pump unit 4.

The motor unit 2 includes an electric motor 6 (see FIG. 4) that rotates (generates a driving force) according to a driving power supplied from the control unit 3. Although a specific example of the electric motor 6 is not particularly limited, for example, an inner rotor type brushless motor can be adopted. Since a configuration of the electric motor 6 is already well known, detailed description will be omitted.

The control unit 3 supplies a power supplied from an external device (not shown) to the electric motor 6 as a drive power. A specific configuration of the control unit 3 will be described later with reference to FIG. 2 and subsequent figures. The pump unit 4 receives the driving force of the motor unit 2 and pumps oil. Since a configuration of the pump unit 4 is already well known, detailed description thereof will be omitted.

The motor unit 2, the control unit 3, and the pump unit 4 are disposed adjacent to each other in a direction in which a rotating shaft 7 (see FIG. 4) of the electric motor 6, which will be described later, extends. More specifically, the control unit 3 is disposed adjacent to one side of the rotating shaft 7 in the extending direction with respect to the motor unit 2 disposed at a center, and the pump unit 4 is disposed adjacent to the other side of the rotating shaft 7 in the extending direction.

The oil pump device 1 includes the housing 10 that accommodates the motor unit 2, the control unit 3, and the pump unit 4. The housing 10 is made of, for example, a metal material such as die-cast aluminum. The housing 10 is not limited to an integral type in which the motor unit 2, the control unit 3, and the pump unit 4 are collectively accommodated, and may be partially constructed as separate bodies.

Figure 2:
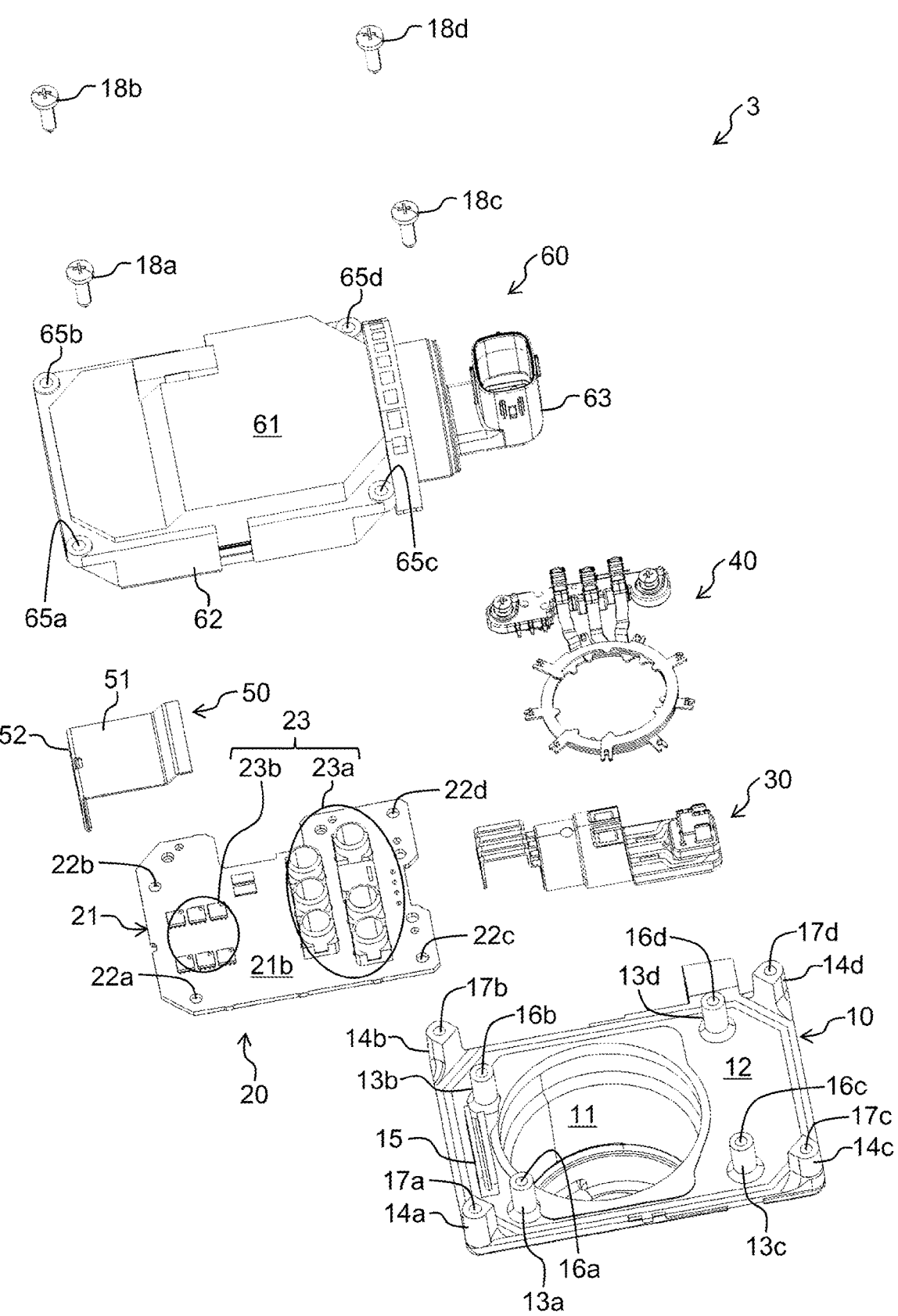
FIG. 2 is an exploded perspective view of a control unit.
Figure 3:
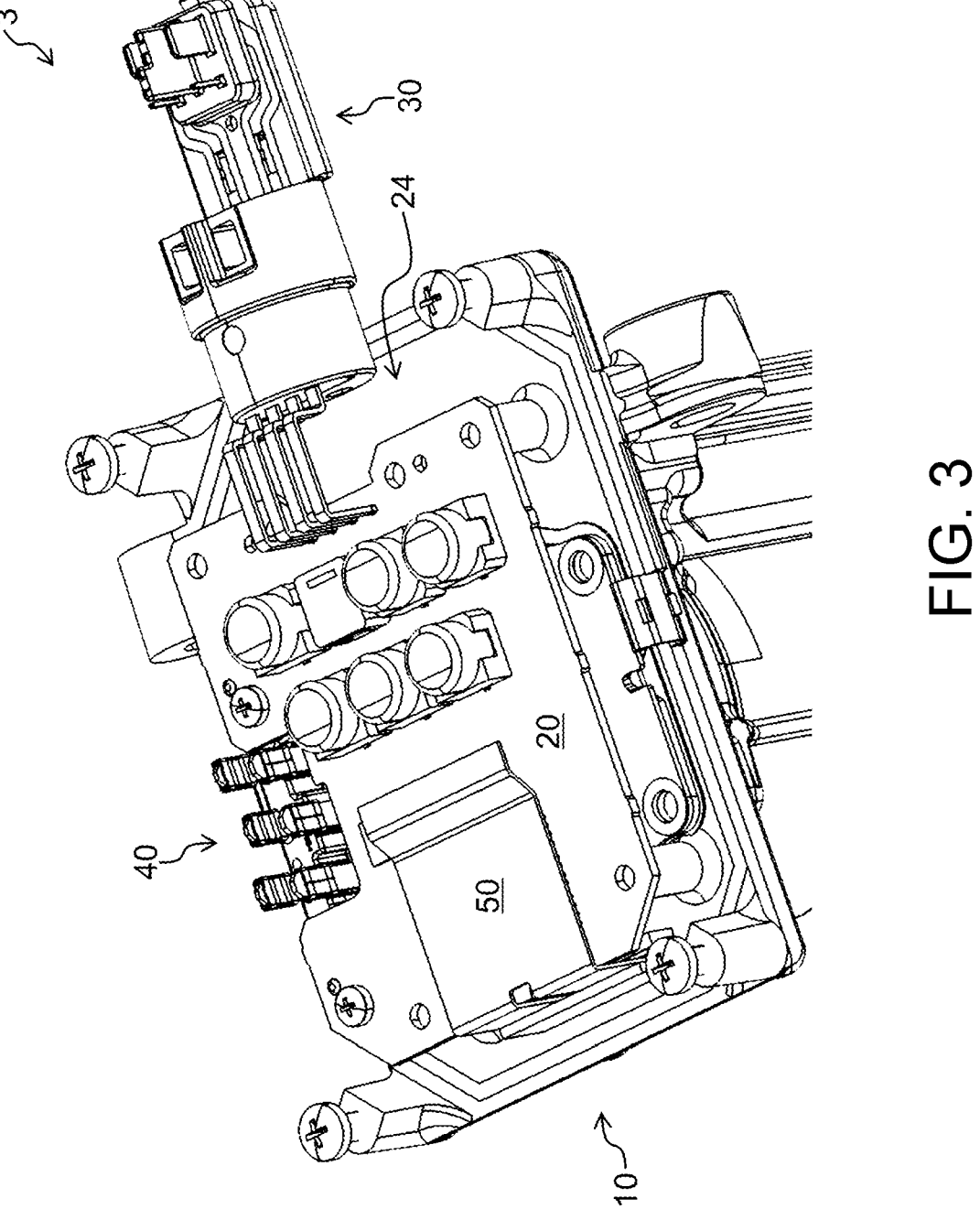
FIG. 3 is a perspective view of the control unit in a state where a cover has been removed.

FIG. 2 is an exploded perspective view of the control unit 3. FIG. 3 is a perspective view of the control unit 3 in a state where a cover 60 has been removed. As shown in FIGS. 2 and 3, the control unit 3 mainly includes the housing 10, a control board 20, a connector unit 30, a relay unit 40, a heat sink 50, and the cover 60. Hereinafter, the extending direction of the rotating shaft 7 will be simply referred to as an "axial direction", and a direction perpendicular to the extending direction of the rotating shaft 7 (a radial direction of the rotating shaft 7) will simply be referred to as a "radial direction".

As shown in FIG. 2, a motor accommodation space 11 that accommodates the electric motor 6 is formed in the housing 10. The motor accommodation space 11 is a space having a generally cylindrical external shape. Furthermore, the housing 10 includes a support surface 12 that supports components (20 to 60) of the control unit 3. The support surface 12 is a surface that extends in the radial direction at a position offset in the axial direction from the motor accommodation space 11. The support surface 12 has a generally rectangular external shape when viewed from the axial direction.

On the support surface 12, a plurality of (in the present embodiment, four) support protrusions 13a, 13b, 13c, and 13d, a plurality of (in the present embodiment, four) screw seats 14a, 14b, 14c, and 14d, and a heat sink support portion 15 are provided.

The support protrusions 13a to 13d protrude in the axial direction from the support surface 12 at different positions on the support surface 12 (typically, positions surrounding the motor accommodation space 11). The support protrusions 13a to 13d support the control board 20 at tips thereof. Furthermore, second positioning holes 16a, 16b, 16c, and 16d that receive positioning pins 64a to 64d, which will be described later, are formed in the support protrusions 13a to 13d. The second positioning holes 16a to 16d extend toward base ends from tips of the support protrusions 13a to 13d.

The screw seats 14a to 14d protrude in the axial direction from the support surface 12 at different positions on the support surface 12 (typically, positions surrounding the motor accommodation space 11). Screw holes 17a, 17b, 17c, and 17d communicating with screw holes 65a to 65d of the cover 60 when the cover 60 is attached to the housing 10 are formed in the screw seats 14a to 14d. The cover 60 is fixed to the housing 10 by screwing the screws 18a to 18d into the communicating screw holes 17a to 17d and 65a to 65d.

The heat sink support portion 15 supports a heat transfer plate 52 of the heat sink 50. The heat sink support portion 15 is provided at a position radially away from the motor accommodation space 11. Further, the heat sink support portion 15 is provided linearly parallel to one of four sides constituting an outer edge of the support surface 12 at a position adjacent to the side.

Figure 4:
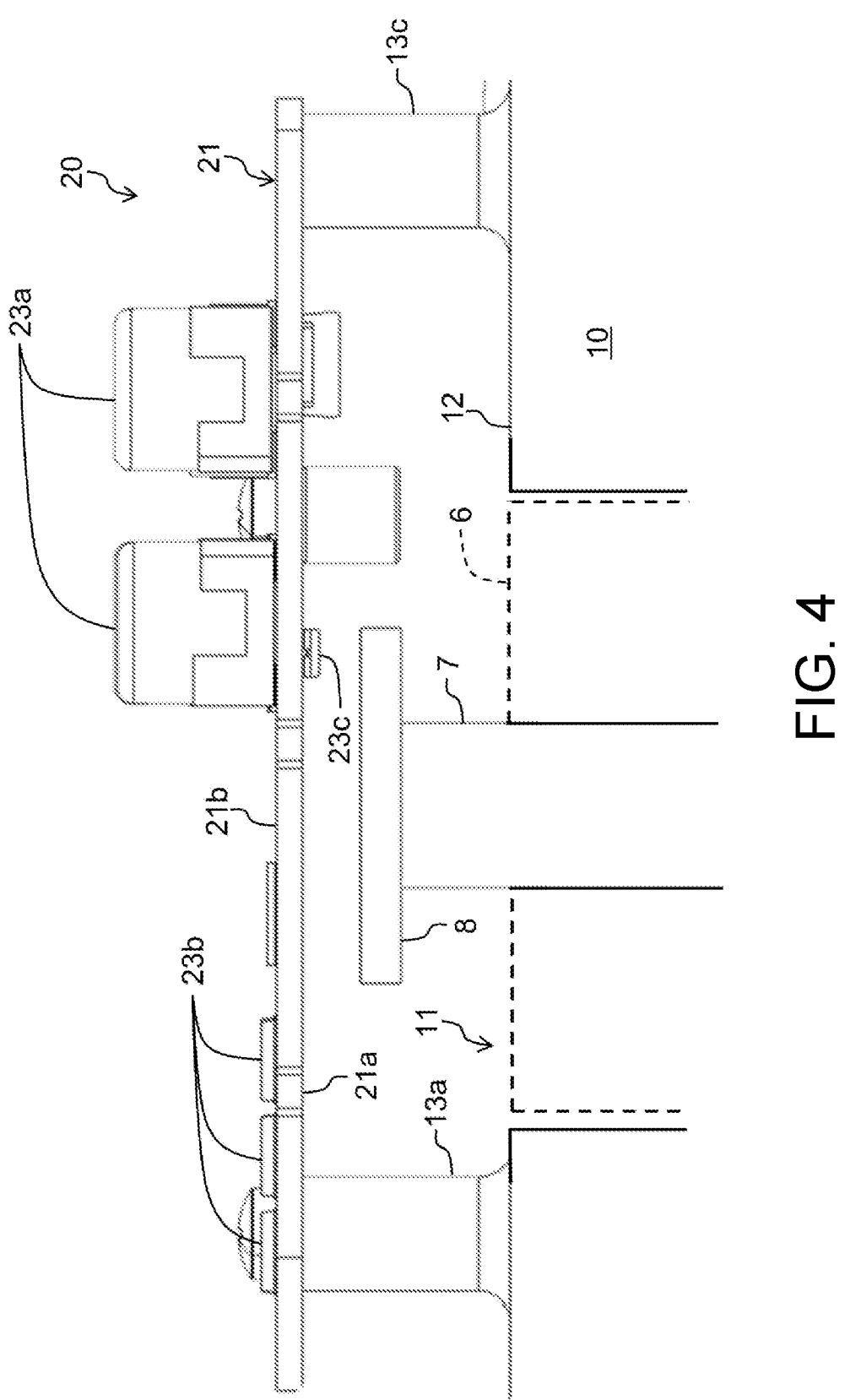
FIG. 4 is a sectional view of the vicinity of a control board.

FIG. 4 is a sectional view of the vicinity of the control board 20. As shown in FIGS. 2 and 4, the control board 20 includes a board 21. The board 21 is a flat member having a generally rectangular external shape. Further, the board 21 has a first surface 21a and a second surface 21b. The first surface 21a is a surface on a side of the board 21 in the thickness direction (a side facing the motor accommodation space 11). The second surface 21b is a surface on the other side of the board 21 in the thickness direction (the side opposite to the first surface 21a). The board 21 is disposed to overlap the motor accommodation space 11 when viewed from the axial direction. Further, an outer edge portion of the board 21 is located outside the motor accommodation space 11 when viewed from the axial direction.

First positioning holes 22a, 22b, 22c, and 22d penetrating in the thickness direction are formed in the board 21. The first positioning holes 22a to 22d are formed at positions corresponding to the support protrusions 13a to 13d at the outer edge portion of the board 21. When the board 21 is supported by the tips of the support protrusions 13a to 13d, the first positioning holes 22a to 22d and the second positioning holes 16a to 16d corresponding thereto communicate with each other. When the positioning pins 64a to 64d are inserted into the first positioning holes 22a to 22d and the second positioning holes 16a to 16d corresponding thereto, the housing 10, the control board 20, and the cover 60 are positioned.

A plurality of circuit elements 23a, 23b, and 23c constituting a control circuit 23 that controls the electric motor 6 are mounted on one or both of the first surface 21a and the second surface 21b of the board 21. In the present embodiment, the circuit elements 23a and 23b are mounted on the second surface 21b, and the circuit element 23c is mounted on the first surface 21a. The circuit element 23c is, for example, a sensor that reads change in a magnetic field of the magnet 8 (rotation of a rotating body) that rotates together with the rotating shaft 7 and detects an amount of rotation of the electric motor 6. That is, the circuit element 23c and the magnet 8 are disposed with a predetermined interval therebetween in the axial direction and the radial direction.

The connector unit 30 connects the external device to the control circuit 23. The connector unit 30 includes a pair of power lines for supplying a drive power output from the external device to the control circuit 23, and a pair of signal lines for transmitting and receiving control signals between the external device and the control circuit 23. The connector unit 30 is housed in a connector holder 63 of the cover 60. For example, the connector unit 30 is inserted and integrally molded when the cover 60 is injection molded.

Figure 5:
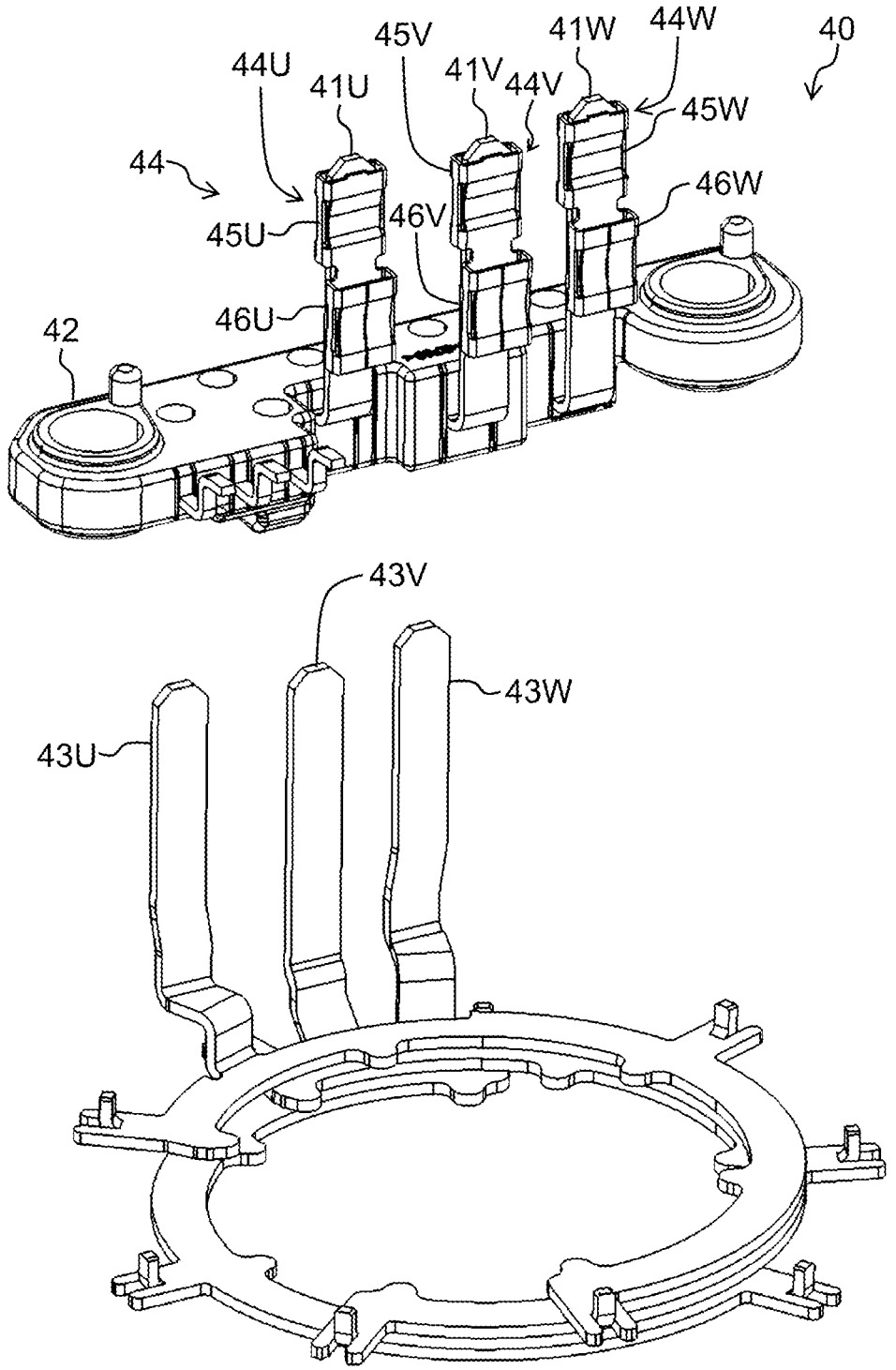
FIG. 5 is an exploded perspective view of a relay unit.

FIG. 5 is an exploded perspective view of the relay unit 40. The relay unit 40 connects the control circuit 23 to the electric motor 6 (more specifically, a coil). The relay unit 40 supplies the three-phase drive power output from the control circuit 23 to the coil. Accordingly, the electric motor 6 rotates. The relay unit 40 includes, for example, circuit side terminals 41U, 41V, and 41W, a terminal holder 42, motor side terminals 43U, 43V, and 43W, and joints 44U, 44V, and 44W.

The circuit side terminals 41U, 41V, and 41W are connected to the control circuit 23. The terminal holder 42 fixes the circuit side terminals 41U, 41V, and 41W to the board 21. The motor side terminals 43U, 43V, and 43W are connected to a coil of the electric motor 6. The joints 44U, 44V, and 44W connect the tips of the circuit side terminals 41U, 41V, and 41W and the motor side terminals 43U, 43V, and 43W.

More specifically, the tips of the circuit side terminals 41U, 41V, and 41W and the motor side terminals 43U, 43V, and 43W extend in the axial direction (more specifically, in a direction from the housing 10 to the cover 60). Further, the joints 44U, 44V, and 44W include a pair of cylindrical portions 45U, 45V, 45W, 46U, 46V, and 46W that receive the tips of the circuit side terminals 41U, 41V, and 41W and the motor side terminals 43U, 43V, and 43W. The cylindrical portions 45U, 45V, 45W, 46U, 46V, and 46W are open on both sides in the axial direction. The tips of the circuit side terminals 41U, 41V, and 41W are inserted into and removed from the cylindrical portions 45U, 45V, and 45W in the axial direction. Similarly, the tips of the motor side terminals 43U, 43V, and 43W are inserted into and removed in the axial direction from the cylindrical portions 46U, 46V, and 46W.

As shown in FIG. 2, the heat sink 50 is a heat radiating member that radiates heat generated by a circuit element 23b to the housing 10. The heat sink 50 is formed of a metal material with high thermal conductivity (for example, copper). For example, when a flat plate is pressed, the heat sink 50 including a heat receiving plate 51 and the heat transfer plate 52 that are bent to intersect (orthogonal to) with each other is formed. That is, the heat sink 50 has a generally L-shaped external shape.

Figure 6:
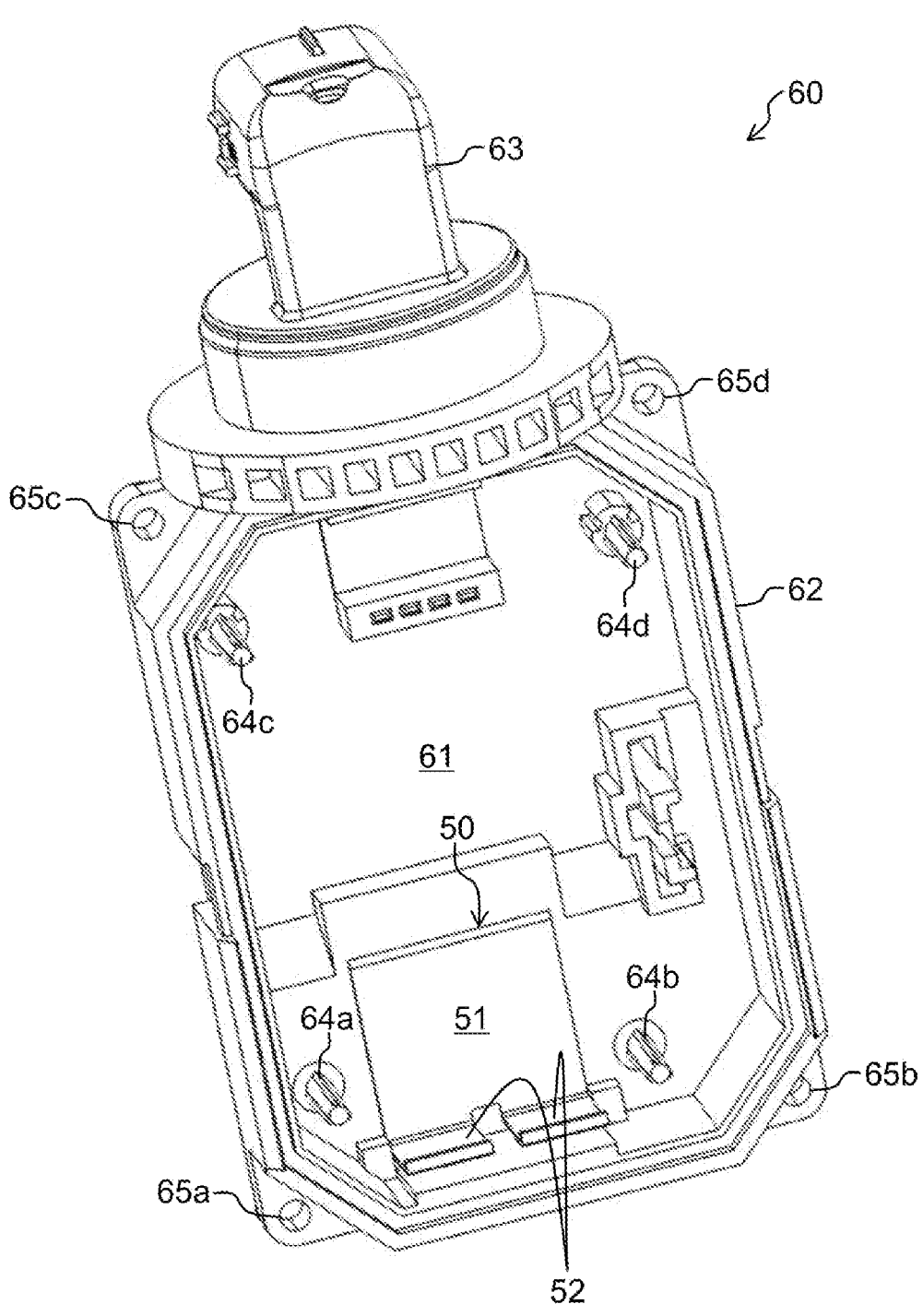
FIG. 6 is a perspective view of the cover viewed from the back side.

FIG. 6 is a perspective view of the cover 60 viewed from the back side. The cover 60 is integrally molded, for example, by injection molding a resin material. That is, the cover 60 is formed of a material that has a lower thermal conductivity than the housing 10 and is lighter than the housing 10. As shown in FIGS. 2 and 6, the cover 60 mainly includes a ceiling wall 61, a side wall 62, the connector holder 63, and a plurality of positioning pins 64a, 64b, 64c, and 64d.

The ceiling wall 61 is a portion that covers the second surface 21b of the control board 20 (substrate 21). When the cover 60 is attached to the housing 10, the ceiling wall 61 faces the second surface 21b at a predetermined interval in the axial direction from the control board 20. Further, the heat receiving plate 51 of the heat sink 50 is attached to a surface (back surface) of the ceiling wall 61 facing the second surface 21b. The heat receiving plate 51, for example, may be attached to the ceiling wall 61 by thermal caulking, or may be inserted when the cover 60 is injection molded. Furthermore, screw holes 65a, 65b, 65c, and 65d penetrating in the thickness direction are formed at four corners of the ceiling wall 61.

The side wall 62 is a frame-shaped portion that covers the periphery of the control board 20. The side wall 62 protrudes toward the housing 10 from an outer edge portion of the ceiling wall 61 (that is, in the axial direction). When the housing 10 is attached to the cover 60, a tip of the side wall 62 abuts the support surface 12 of the housing 10. Accordingly, a board accommodation space 24 for housing the control board 20 is formed between the housing 10 and the cover 60 (more specifically, the support surface 12, the ceiling wall 61, and the side wall 62). The connector holder 63 is provided outside the side wall 62 to hold the connector unit 30.

The positioning pins 64a to 64d protrude in the axial direction toward the housing 10 from the back surface of the ceiling wall 61 inside the side wall 62. The positioning pins 64a to 64d are inserted into the first positioning holes 22a to 22d and the second positioning holes 16a to 16d corresponding thereto in the axial direction to position the housing 10, the control board 20, and the cover 60. Since the positioning pins 64a to 64d have the same configuration, the positioning pin 64a will be described below.

Figure 7A:
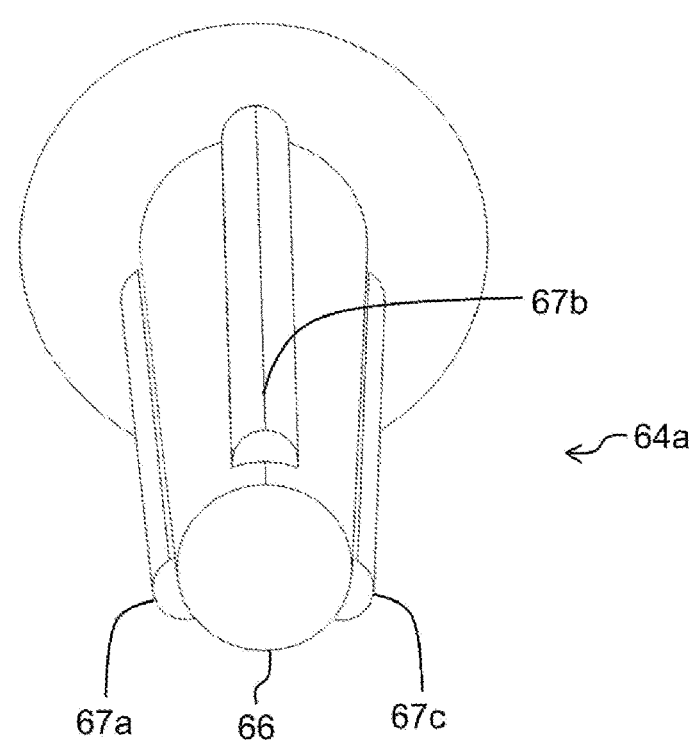
FIG. 7A is a perspective view of a positioning pin and FIG. 7B is a view as viewed from the tip side.
Figure 7B:
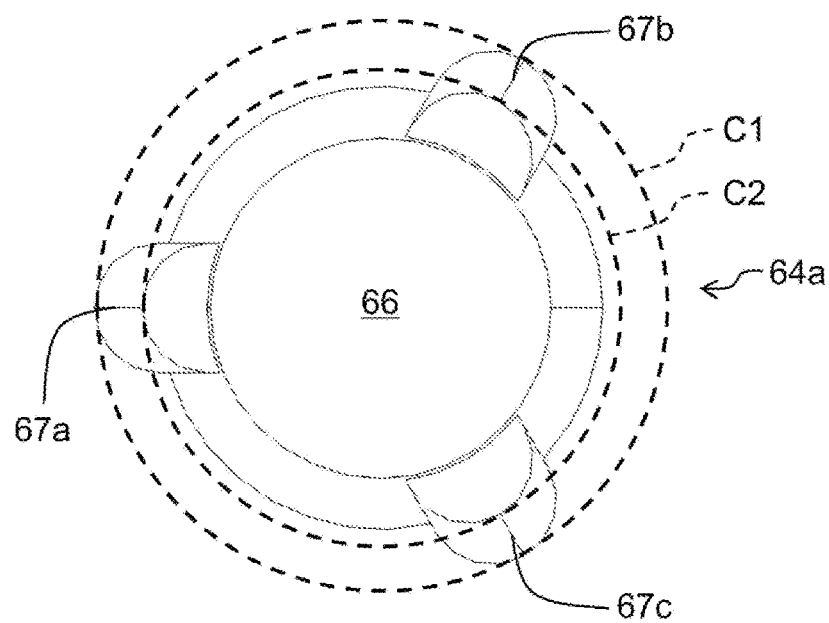

FIG. 7A is a perspective view of the positioning pin 64a and FIG. 7B is a view viewed from the tip side. The positioning pin 64a has, as a whole, a tapered external shape (truncated conical shape) whose diameter gradually decreases toward the tip. More specifically, as shown in FIGS. 7A and 7B, the positioning pin 64a includes a pin body 66, and a plurality of protrusions 67a, 67b, and 67c. The number of protrusions 67a to 67c may be three or more.

The pin body 66 protrudes in the axial direction toward the housing 10 from the back surface of the ceiling wall 61. Further, the pin body 66 has a truncated conical external shape. That is, the pin body 66 has a tapered shape whose diameter gradually decreases toward the tip. Furthermore, a cross section (cross section perpendicular to the protruding direction) of the pin body 66 is perfectly circular.

The protrusions 67a to 67c are provided at positions spaced apart in a circumferential direction on an outer peripheral surface of the pin body 66. More specifically, the protrusions 67a to 67c are provided at equal intervals (120° intervals) in the circumferential direction of the outer peripheral surface of the pin body 66. Furthermore, the protrusions 67a to 67c protrude in the radial direction of the pin body 66. Furthermore, the protrusions 67a to 67c extend in the direction in which the pin body 66 extends. An amount of protrusion of the protrusions 67a to 67c is the same at all positions in the extending direction.

As a result, as shown in FIG. 7B, diameters of circumscribed circles C1 and C2 (virtual circles connecting protruding tips of the protrusions 67a to 67c) of the positioning pin 64a gradually become smaller toward the tips. However, configurations of the pin body 66 and the protrusions 67a to 67c are not limited to the above-described example. As another example, the pin body 66 may have a cylindrical shape with the same diameter in the extending direction. Further, the protrusions 67a to 67c may have an amount of protrusion that gradually decreases toward the tips.

Figures 8A, 8B, 8C:
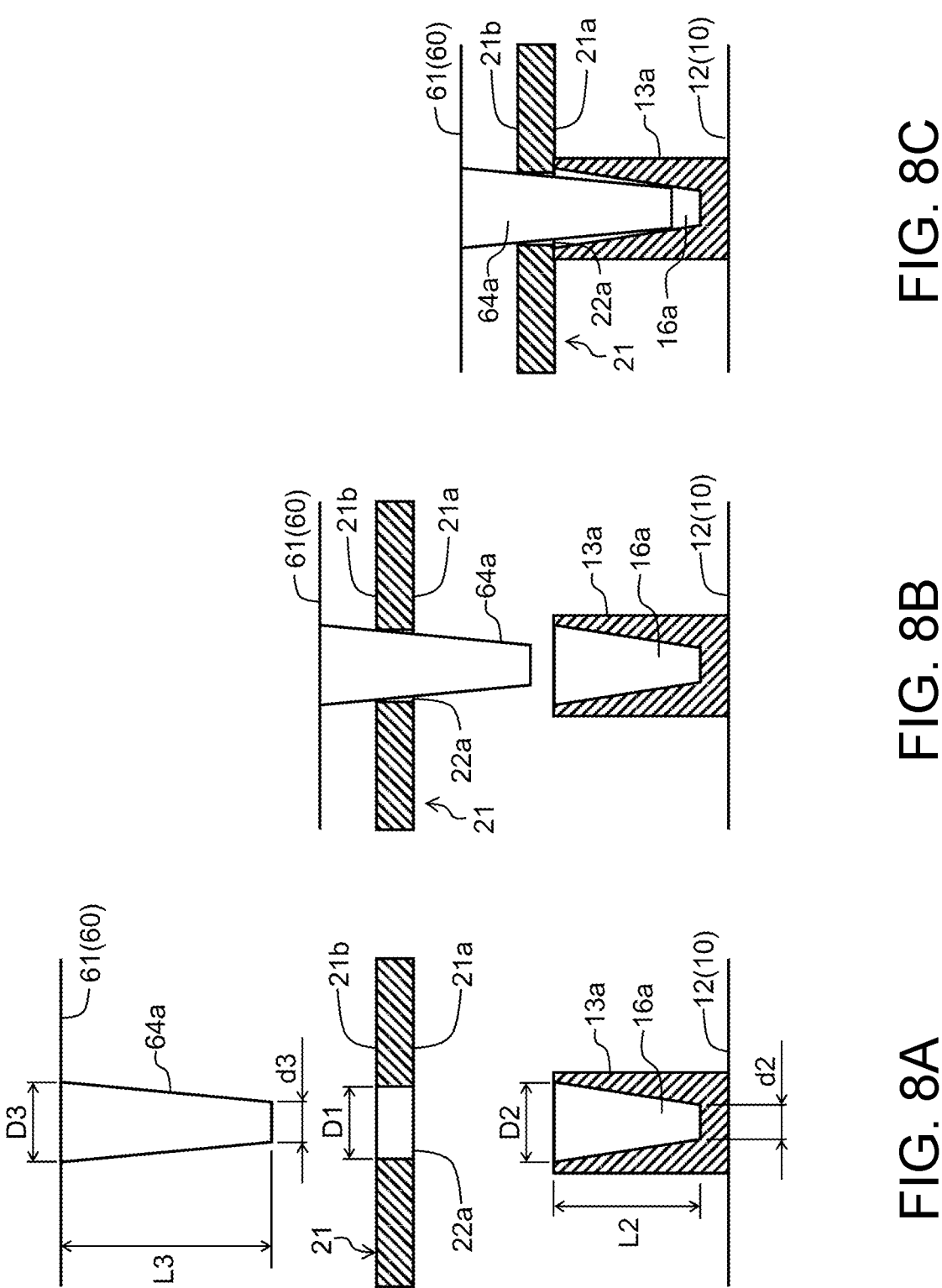
FIGS. 8A to 8C are diagrams showing a relationship between a positioning pin, a first positioning hole, and a second positioning hole.

FIGS. 8A to 8C are diagrams showing a relationship between the positioning pin 64a, the first positioning hole 22a, and the second positioning hole 16a. In FIGS. 8A to 8C, only an outline of the circumscribed circle of the positioning pin 64a is shown without distinguishing between the pin body 66 and the protrusions 67a to 67c.

A diameter D1 of the first positioning hole 22a is the same at all positions in the thickness direction of the board 21. The second positioning hole 16a has a tapered shape in which a diameter gradually decreases from the tip to the base end of the support protrusion 13a. That is, the second positioning hole 16a has the largest diameter D2 of an open end (the tip side of the support protrusion 13a) and the smallest diameter d2 at the back end (the base end side of the support protrusion 13a). The positioning pin 64a has a smallest diameter d3 of the tip and the largest diameter D3 of the base end. Further, the circumscribed circle of the positioning pin 64a and cross sections of the first positioning hole 22a and the second positioning hole 16a are all perfectly circular.

The diameter d3 at the tip of the positioning pin 64a is smaller than the diameter D1 of the first positioning hole 22a, smaller than the diameter D2 at the open end of the second positioning hole 16a, and larger than the diameter d2 at the base end of the second positioning hole 16a. Further, the diameter D3 of the base end of the positioning pin 64a is larger than the diameter D1 of the first positioning hole 22a. Further, a length L3 (a dimension in the axial direction) of the positioning pin 64a is larger than a depth L2 (a dimension in the axial direction) of the second positioning hole 16a. Furthermore, a taper ratio (=(D3−d3)/L3) of the positioning pin 64a is smaller than a taper ratio (=(D2−d2)/L2) of the second positioning hole 16a.

Next, a procedure for assembling the housing 10, the control board 20, and the cover 60 will be described. At a start point in time of assembly, it is assumed that the control circuit 23 (particularly the circuit element 23c), the circuit side terminals 41U, 41V, and 41W, and the terminal holder 42 are attached to the board 21, and the electric motor 6 to which the magnet 8 and the motor side terminals 43U, 43V, and 43W are attached is accommodated in the motor accommodation space 11. Further, as shown in FIG. 5, the tips of the circuit side terminals 41U, 41V, and 41W are inserted into the cylindrical portions 45U, 45V, and 45W.

First, the positioning pin 64a is inserted into the first positioning hole 22a from the second surface 21b side of the board 21. As shown in FIG. 8B, when an outer circumferential surface of the positioning pin 64a is inserted up to a position coming into contact with an inner circumferential surface of the first positioning hole 22a over the entire circumference (so-called low pressure fitting), the control board 20 and the cover 60 are positioned. In this case, the tip of the positioning pin 64a protrudes toward the first surface 21a of the board 21.

Next, the positioning pin 64a protruding toward the first surface 21a of the board 21 is inserted into the second positioning hole 16a. As shown in FIG. 8C, when the first surface 21a of the board 21 abuts onto a tip of the support protrusion 13a, and the tip of the positioning pin 64a is inserted up to a position coming into contact with an inner circumferential surface of the second positioning hole 16a over the entire circumference (so-called low pressure fitting), the housing 10, the control board 20, and the cover 60 are positioned.

Further, in the process of inserting the positioning pin 64a into the second positioning hole 16a, the heat transfer plate 52 is inserted into the heat sink support portion 15, and the tips of the motor side terminals 43U, 43V, and 43W are connected to the cylindrical portions 46U, 46V, and 46W, and the magnet 8 and the circuit element 23c are positioned at a predetermined interval.

Further, when the positioning pin 64a is inserted into the second positioning hole 16a to a position shown in FIG. 8C, the screw holes 17a to 17d and 65a to 65d communicate with each other. The screws 18a to 18d are screwed into the communicating screw holes 17a to 17d and 65a to 65d, so that the cover 60 is attached to the housing 10 in a state where the housing 10, the control board 20, the heat sink 50, and the cover 60 are positioned.

According to the embodiment, for example, the following effects are achieved.

According to the above embodiment, the housing 10, the control board 20, and the cover 60 are positioned simply by inserting the positioning pins 64a to 64d into the first positioning holes 22a to 22d and the second positioning holes 16a to 16d. As a result, it is possible to simplify the assembly process while maintaining the positional accuracy of the housing 10, the control board 20, and the cover 60 as compared to positioning the control board 20 and cover 60 individually with respect to the housing 10.

In particular, it is possible to reduce a work of tightening screws in the assembly process since it is possible to reduce the number of screws as compared to Patent Document 1. Further, since an amount of shavings at the time of screwing can be reduced, contamination can be prevented, and this contributing to the prevention of waste generation due to a decrease in the number of defective products. Furthermore, since a weight of the oil pump device 1 can be reduced as compared to a cover made of metal by adopting the cover 60 made of a resin, this can contribute to carbon neutrality.

Furthermore, according to the embodiment, when the positioning pins 64a to 64d have a tapered shape, the housing 10, the control board 20, and the cover 60 are positioned with high accuracy finally (at a time in time when the positioning pins 64a to 64d are low pressure fitted into the positioning holes 22a to 22d and 16a to 16d) even when the positioning pins 64a to 64d are not subjected to precise position adjustment at a point in time when the positioning pins 64a to 64d start to be inserted into the positioning holes 22a to 22d and 16a to 16d. As a result, the assembly process is further simplified.

Further, according to the embodiment, it is possible to reduce contact surface pressure of the positioning pins 64a to 64d with respect to the positioning holes 22a to 22d and 16a to 16d by configuring the positioning pins 64a to 64d using the pin body 66 and the protrusions 67a to 67c.

Further, according to the embodiment, since it is possible to increase the diameter D2 of the opening end by causing the second positioning holes 16a to 16d to have a tapered shape, the housing 10, the control board 20, and the cover 60 are finally positioned with high accuracy even when the positioning pins 64a to 64d are not subjected to precise position adjustment at an insertion start point in time. As a result, the assembly process is further simplified.

Further, according to the embodiment, the positioning pins 64a to 64d are low pressure fitted into the second positioning holes 16a to 16d by making the taper ratio of the positioning pins 64a to 64d smaller than the taper ratio of the second positioning holes 16a to 16d. This further improves the positional accuracy of the housing 10, the control board 20, and the cover 60.

Further, according to the embodiment, it becomes easy to remove the mold at the time of injection molding by causing the positioning pins 64a to 64d and the second positioning holes 16a to 16d to have a tapered shape. In this regard, it is desirable for the outer circumferential surfaces of the support protrusions 13a to 13d and the screw seats 14a to 14d to also have a tapered shape in which the diameter gradually increases from the tip to the base end.

The embodiments of the disclosure have been described above. The disclosure is not limited to the embodiments described above, and includes various modification examples. For example, the above-described embodiments have been described in detail to explain the disclosure in an easy-to-understand manner, and the disclosure is not necessarily limited to that including all the described configurations. Further, it is possible to replace a part of the configuration of the present embodiment with the configuration of other embodiments, and it is also possible to add the configuration of other embodiments to the configuration of the present embodiment. Furthermore, it is possible to perform addition, deletion, or replacement of other configurations with respect to some of the configurations of the present embodiment.

What is claimed is:

1. A control device comprising:

a control board on which a control circuit for controlling an electric motor is mounted;

a housing configured to support a surface on a side of the control board in a thickness direction; and a cover attached to the housing to cover a surface on an other side of the control board in the thickness direction and a periphery of the control board, wherein a plurality of first positioning holes penetrating in the thickness direction are formed in the control board, a plurality of second positioning holes respectively corresponding to the plurality of first positioning holes are formed in the housing, the cover includes a plurality of positioning pins that protrude toward the housing and have a tapered shape in which a diameter of a circumscribed circle gradually decreases toward a tip, and the positioning pin is inserted into the first positioning hole and the second positioning hole corresponding thereto to position the control board, the housing, and the cover.

2. The control device according to claim 1, wherein the positioning pin includes a pin body having a tapered shape in which a diameter gradually decreases toward a tip; and protrusions protruding in a radial direction of the pin body and extending in a direction in which the pin body extends at least three locations spaced apart in a circumferential direction on an outer circumferential surface of the pin body.

3. The control device according to claim 1, wherein the housing includes a plurality of support protrusions that support the control board at tips, and the second positioning holes extend toward a base end from the tips of the support protrusions.

4. The control device according to claim 3, wherein the second positioning hole has a tapered shape whose diameter gradually decreases toward the base end of the support protrusion, and a taper ratio of the positioning pin is smaller than that of the second positioning hole.

5. A motor device comprising:

an electric motor supported by a housing; and the control device according to claim 1 configured to control the electric motor.

6. The motor device according to claim 5, comprising:

a terminal extending toward the control board from the electric motor; and a joint configured to receive the terminal in a process of inserting the positioning pins into the first positioning holes and the second positioning holes corresponding thereto, and supply a driving power generated by the control board to the electric motor through the terminal.

7. The motor device according to claim 5, comprising:

a rotating body configured to rotate together with a rotating shaft of the electric motor; and a sensor fixed to the control board to read rotation of the rotating body and detect an amount of rotation of the electric motor.

8. An oil pump device comprising:

the motor device according to claim 5; and a pump unit configured to pump oil using a driving force of the electric motor.

* * * * *